United States Patent [19]

Huff

[11] 4,354,323
[45] Oct. 19, 1982

[54] LONG FISHING LINE APPARATUS WITH MOVABLE MULTIPLE SKATE RACKS, A TWO POSITION MAIN HAULER AND A SLACK TAKER, AND A WATER AGITATED AUTOMATIC BAITER

[76] Inventor: Warren P. Huff, 15717 Crescent Valley Dr. NW., Gig Harbor, Wash. 98335

[21] Appl. No.: 99,606

[22] Filed: Dec. 3, 1979

[51] Int. Cl.³ .................... A01K 79/00; A01K 11/06
[52] U.S. Cl. .................................. 43/4; 43/54.5 A; 43/55
[58] Field of Search ............... 43/1, 4, 4.5, 5, 6.5, 43/8, 27.2, 27.4, 54.5 A, 55, 57, 57.5 R, 57.5 A; 114/225; 242/47; 254/332, 382; 269/44, 45

[56] References Cited

U.S. PATENT DOCUMENTS

| 308,051 | 11/1884 | Bixby | 269/45 X |
|---|---|---|---|
| 356,937 | 2/1887 | Harding | 269/45 X |
| 2,100,763 | 11/1937 | Kersenbrock | 43/54.5 A |
| 2,531,643 | 11/1950 | Pringle | 43/27.4 |
| 2,670,565 | 3/1954 | Platt | 43/54.5 A |
| 3,029,545 | 4/1962 | Hess et al. | 43/27.4 X |
| 3,047,978 | 8/1962 | Glover | 43/27.4 X |
| 3,466,785 | 9/1969 | Shook | 43/27.4 |
| 3,765,614 | 10/1973 | Bartl et al. | 242/47 |
| 3,775,894 | 12/1973 | Goddard | 43/54.5 A |
| 3,842,530 | 10/1974 | Jackson et al. | 43/54.5 A |
| 4,015,359 | 4/1977 | Andrews | 43/4 |
| 4,168,590 | 9/1979 | Beshoner | 43/55 |

FOREIGN PATENT DOCUMENTS

| 470991 | 1/1951 | Canada | 43/4 |
|---|---|---|---|
| 973709 | 9/1975 | Canada | 43/4 |
| 691764 | 5/1940 | Fed. Rep. of Germany | 254/332 |
| 76025 | 12/1949 | Norway | 43/4 |
| 92763 | 9/1958 | Norway | 43/4 |
| 1211901 | 11/1970 | United Kingdom | 43/4 |
| 2016881 | 9/1979 | United Kingdom | 43/27.4 |

OTHER PUBLICATIONS

World Fishing, Sep. 1971, pp. 26-27, "New Hope for Longlining".

Primary Examiner—Stephen G. Kunin
Assistant Examiner—Robert P. Olszewski
Attorney, Agent, or Firm—Roy E. Mattern, Jr.

[57] ABSTRACT

A long fishing line method and apparatus are respectively centered on the use of movable multiple skate racks, which upon hauling, receive a string of gear or interconnected skates, with the fish just removed, via a two position, vertical and horizontal, main hauler operated in conjunction with a slack taker, and which upon setting, distribute a string of gear or interconnected skates into a water agitated and stirred automatic fish hook baiter. Each movable skate rack preferably holds substantially 1800 feet of ground line with approximately 600 hooks with their gangions of 10 to 25 inches long, spaced at 30 to 48 inches. The fish hooks of each skate are conveniently and firmly held in a vertically captive position with their pointed ends placed over and then rotated down within a top opening integral receiver, extending the full length of the movable skate rack, which also has an integral upright full length planar bar, with near end cutouts used in slidably mounting the movable skate rack alongside others on hanger beams. Upon hauling in a buoyline, the main hauler rotative drive shaft is horizontal, thereby positioning the sheave vertically, and thereafter upon hauling in the ground line of the long fishing line, with its gangions and fish hooks the main hauler rotative drive shaft is vertical, thereby positioning the sheave horizontally. When setting the long fishing line, with a boat underway, a buoy is thrown overboard and a buoyline follows under the created pulling force. Then an anchor enters the sea carrying the lower end of the buoyline and the start of the ground line toward the bottom, as interconnected skates are pulled from successive movable skate racks, and each hook is guided through a water stirred baiter to snag bait, a follow on bait recovery channel, and then into the sea.

22 Claims, 15 Drawing Figures

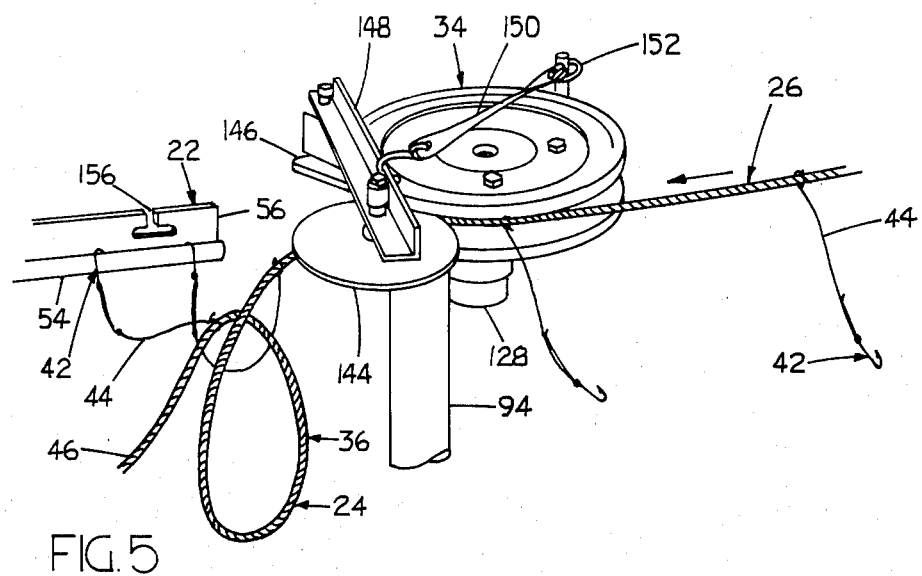
FIG.5
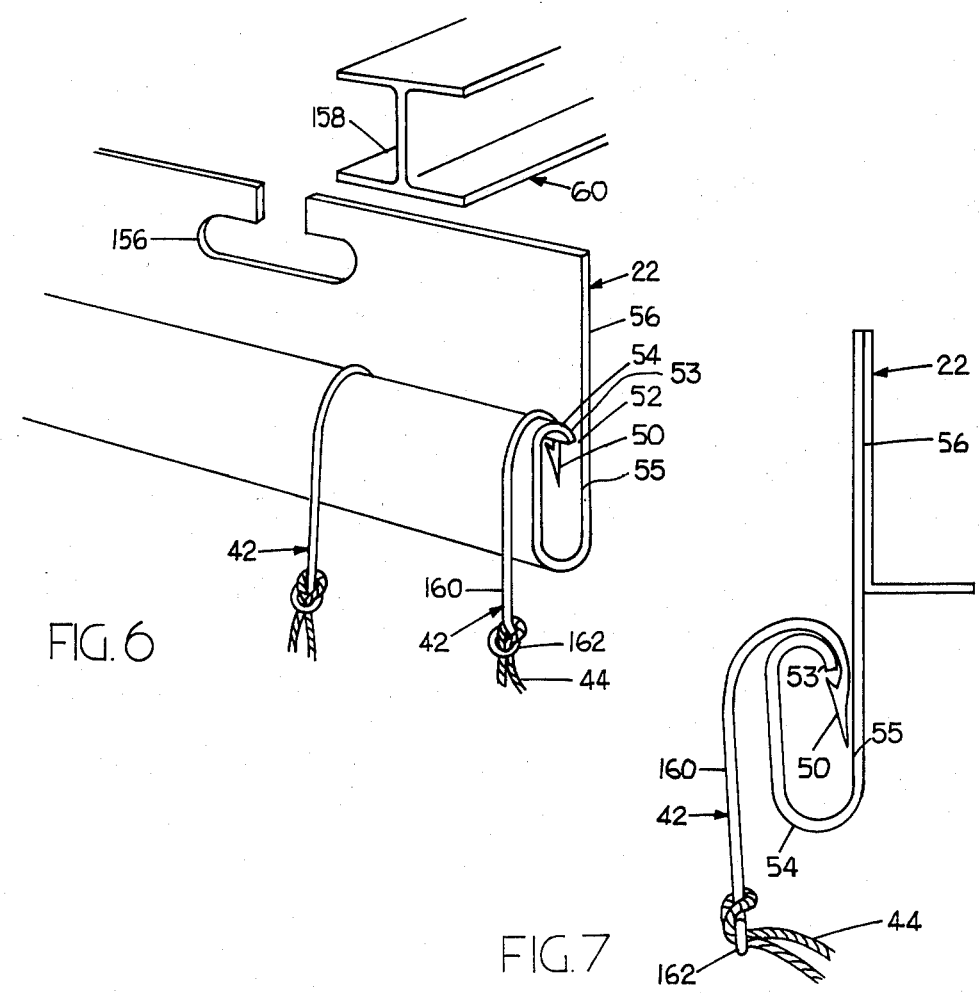
FIG.6
FIG.7

LONG FISHING LINE APPARATUS WITH MOVABLE MULTIPLE SKATE RACKS, A TWO POSITION MAIN HAULER AND A SLACK TAKER, AND A WATER AGITATED AUTOMATIC BAITER

BACKGROUND OF THE INVENTION

There are methods and related apparatus to eliminate many direct hand operations in hauling and setting long fishing lines, and in so doing to receive, store, and deploy skates, comprised of ground line, gangions, and their hooks, and during the deployment to automatically bait the departing hooks. Kenneth F. Tison in his U.S. Pat. Nos. 3,626,630 and 3,841,011, and with Oliver L. Tremoulet, Jr. in their U.S. Pat. No. 3,903,632, illustrate and describe such long fishing line baiting, setting, hauling, handling, and storage, centering on the use of multiple rotatable reels to receive the ground line, while at the same time selectively receiving the hooks on spokes projecting from these reels.

Also there have been and are methods and related apparatus to improve trotline fishing, wherein a plurality of hooks, no closer than 3 feet, are attached to a main fishing line by stringers or leaders, and the main fishing line is placed between spaced stakes in a body of water, or between a stake and a boat in a stream, lake, bay, etc. As illustrated and described in many patents, such as U.S. Pat. Nos. 2,100,763; 2,158,947; 2,531,643; 2,541,920; 2,670,565; 3,029,545; 3,047,978; 3,466,785; 3,626,630; 3,775,894; 3,842,530; and 3,945,144, trotline receiver-holder-dispenser apparatus of various configurations are being provided, so a fisherman may handle such a trotline with its multiple hooks and leaders, without entanglements and without hook injury to himself or herself. Apparently, only one receiver-holder-dispenser apparatus is used at one end location of an overall trotline fishing line.

Also a Mustad long fishing line apparatus is utilized. It is believed that non movable racks are used which receive fish hooks along or at their top portions.

SUMMARY OF THE INVENTION

A long fishing line method and apparatus centers on the use of multiple movable skate racks receiving a string of gear, with fish just removed, via a two position main hauler and a slack taker, and alternately distributing a string of gear through a water agitated automatic baiter, as setting occurs when a fishing boat is underway. Utilization of these movable skate racks makes the respective hauling and setting operations continuous methods, not requiring any shutdown for the interchange of apparatus receiving or delivering the strings of gear or the skates, which are interconnected to form the long fishing line for sable etc. fishing. Moreover, during hauling, snarls and entanglements are readily guided around the main hauler and/or the slack taker, and positioned on the skate racks for subsequent convenient, effective, and efficient, rearrangement. Also if necessary respective repairs of hooks, gangions, and the ground line itself are conveniently undertaken, while the skates are supported on these movable racks, as they are suspended entirely by their hooks, which are easily and captively received via the downwardly rotating entrapment of their barbed end hooks in an integral receiver extending the full length of the skate rack. Also an integral planar bar, raising upwardly from the receiver and extending the full length of the skate rack, has near end cut outs used to slidably mount the movable skate rack alongside others, parallel to one another, on spaced hanger beams. A powered bait cutter rapidly produces bait in selectable sizes, which in turn are placed in a baiter and agitated and stirred by flowing water under pressure, while the hooks are guided and pulled through the cut bait in the baiter and beyond for the setting of the long fishing line, when the fishing boat is underway. Any bait pulled through the baiter but not sufficiently hooked or never hooked is retrieved and guided for collection and reentry into the automatic baiter.

DESCRIPTION OF THE DRAWINGS

A preferred embodiment of the sable etc. fishing long fishing line apparatus centering on the use of movable multiple skate racks receiving a string of gear, is illustrated in the drawings, wherein;

FIG. 5 is a perspective view of the upper portions of a slack taker arranged for continuing the handling of the long fishing line carrying its gangions, i.e. leaders, and hooks, and while so doing, compensating for slack changes occurring as the long fishing line leaves the main hauler and is being directed to the skate racks, and also protecting any crew member, while he or she is working to place the hooks on the skate racks, from any unwanted tension and twisting loads on the long fishing line occurring during the hauling operations, with the direction of the movement of the incoming long fishing line being indicated by an arrow, and with the long fishing line being shown as it is driven by the sheave, while rotatably held in part of its travel by a resiliently biased line following wheel and then being cleared by a stripper for its subsequent handling at the movable skate racks, as the hooks of this long fishing line are vertically restrictively retained in a receiver, yet are slidable along the skate rack, resulting in the horizontal coiling of an entire skate of ground line supported by its gangions and hooks from a movable skate rack with additional skates being so supported on multiple adjacent skate racks collectively receiving the entire long fishing line;

FIG. 6, is a perspective view illustrating an end portion of a movable skate rack with its integral upright full length planar bar having a cutout receiving portion about to be slidably positioned along the lower flange of a hanger beam, preferably made from an I beam, and also showing how the hooks of the long fishing line are arranged slidably and vertically along the skate rack or bar with their pointed barbed ends directed downwardly and restrictively into the integral receiver, which also extends the full length of the skate rack, which is preferably made from a stainless steel plate;

FIG. 7 is an enlarged cross sectional view of the movable skate rack and a fish hook barbed end which has been directed downwardly and rotated for subsequent essentially vertical restriction, unless especially rotatably redirected upwardly, or horizontally moved clear of the receiver, indicating the essentially vertical position of the shank of the fish hook with its eye attachment to the gangion or leader, in turn attached to the ground or main long fishing line at this skate portion thereof;

Figure 1:
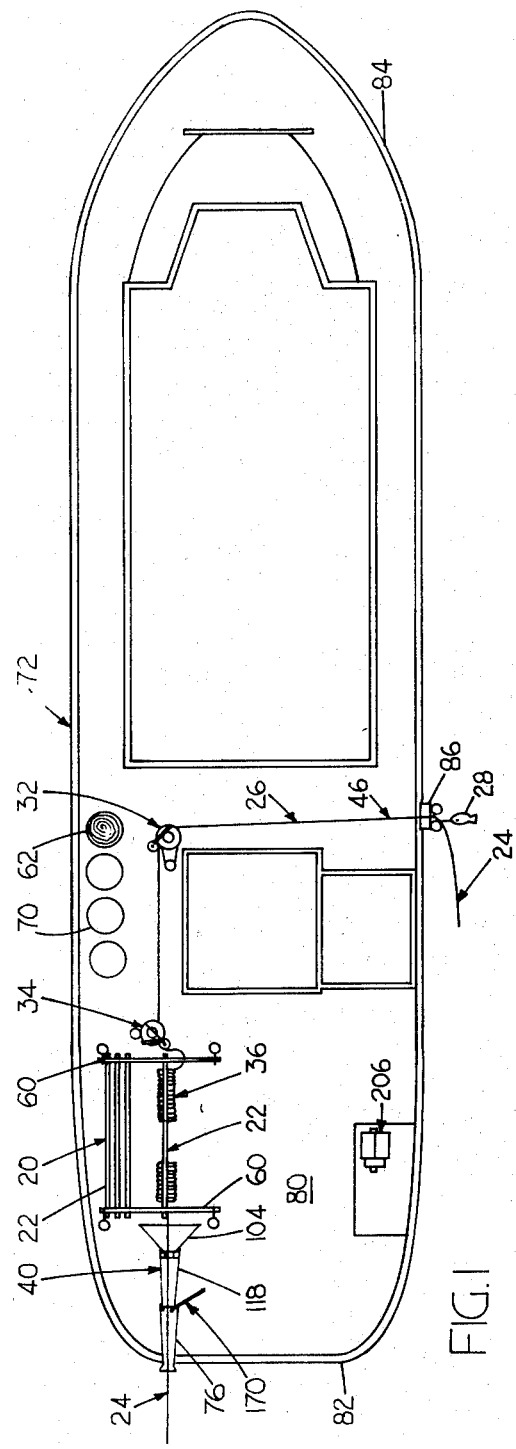
FIG. 1 is a top view of a fishing boat or ship showing only some of the conventional deck cabins and equipment, and illustrating a preferred arrangement of the components of the overall preferred embodiment of the long fishing line apparatus centering on the use of the movable multiple skate racks.

DESCRIPTION OF THE PREFERRED EMBODIMENT OF THE INVENTION
INTRODUCTION TO THE OVERALL APPARATUS

A preferred embodiment of a sable fishing long fishing line apparatus 20 is illustrated in the drawings, FIGS. 1 through 15, centering on the use of multiple and movable skate racks 22, each of which, upon hauling in of the fishing line 24, receives a string of gear 26, with the fish 28 just removed, via a two position, vertical and horizontal, main hauler 32 operated in conjunction with a slack taker 34, and each of which, upon setting, distributes a string of gear 26, preferably a complete skate 36, into a water agitated and stirred fish hook baiter 40. Each movable skate rack 22 preferably holds a complete skate 36 of a string of gear 26, with the fish hooks 42 and their respective gangions or leaders 44, spaced apart and depending from the ground line 46. A skate 36 is supported on a skate rack 22 as each of its fish hooks 42 are conveniently, firmly, restrictively, and slidably held in a vertically captive position. Their pointed and barbed ends 50 are placed over and then rotated down within a top opening 52 of an integral receiver 54, which extends the full length of the skate rack 22. Also each movable skate rack 22 has an integral upright full length planar bar 56, having in turn near end cutout structures 156 used in slidably moving the movable skate rack 22 alongside others on hanger beams 60. Upon hauling in a buoyline 62, the main hauler 32 rotative drive shaft 66 is arranged horizontally, thereby positioning the sheave 68 vertically, so the buoyline 62 may be easily coiled into a tub 70. Subsequently, in continuing to haul in the long fishing line, in order to haul in the ground line 46 of the long fishing line 24, with its gangions 44, and fish hooks 42, the main hauler rotative drive shaft 66 is arranged vertically, thereby positioning the sheave 68 horizontally to receive the ground line 46. Upon setting the long fishing line 24, the interconnected skates 36 or string of gear 26 are pulled from successive movable skate racks 22, under the force created when the boat or ship 72 is underway and the buoy is thrown into the sea with the buoyline following and eventually the anchor is set to continue on with the setting of the ground line with its gangions and baited hooks. After leaving the movable skate rack, held in its discharge position by a tiltable alignment and spacer positioner 74, each fish hook 42 is guided through a water agitated and stirred baiter 40, a follow on recovery chute or channel 76, and then directed for over the stern entry into the sea.

PREFERRED ARRANGEMENT OF THE OVERALL APPARATUS ON THE DECK OF A BOAT OR SHIP

Hauling In

Figure 2:
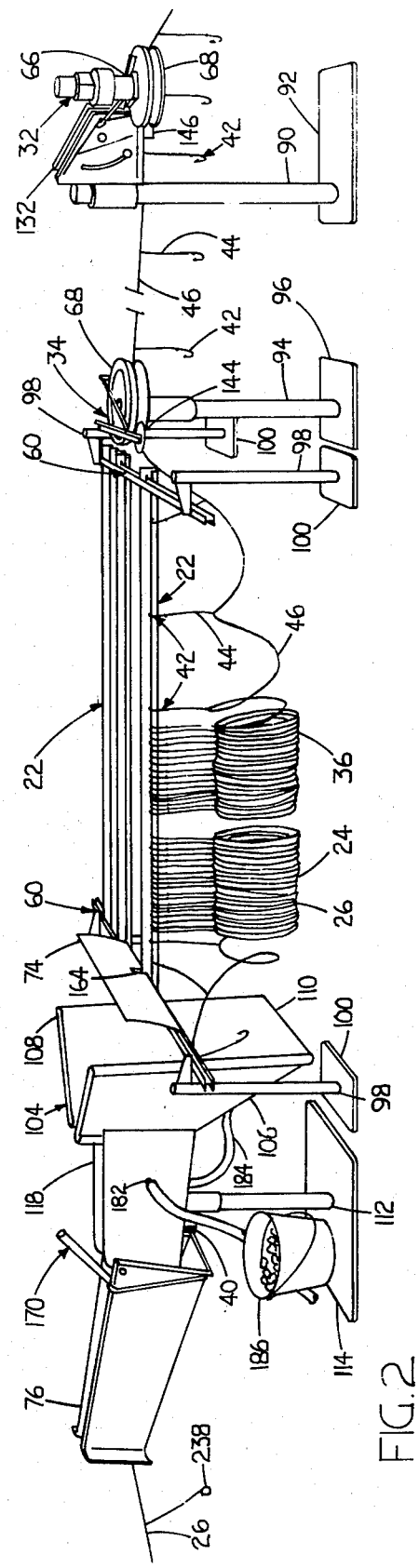
FIG. 2 is a perspective view of all of the components of the long fishing line apparatus which are positioned along the shipboard deck path of the ground line from a main hauler, to a slack taker, to movable multiple skate racks slidably supported on beams, to the baiter, past the brake, and then overboard for setting in the sea.

As illustrated in FIGS. 1 and 2, the long fishing line apparatus 20 is preferably arranged on the main deck 80, nearer the stern 82 than the bow 84 of a boat or ship 72. Upon hauling in of the long fishing line 24, the buoyline 62 is first hauled in and placed in tubs 70 on the main deck 80. Then the rest of the string of gear 26 is hauled in with ground line 46, as the buoyline 62 before it was also hauled in, by using a roller assembly 86, which is generally always used at the side of a fishing boat 72 where the fish are being removed, when hauling in such fishing lines 24. The ground line 46 with the depending gangions 44 and fishing hooks 42 is then powered about a main hauler 32, supported above the main deck 80 on its stanchion 90 and base plate 92. Thereafter, the ground line 46 with its gangions 44 and hooks 42 is also powered about a slack taker 34, supported above the main deck 80 on its stanchion 94 and base plate 96.

As the ground line 46 leaves the slack taker 34, a crew person places each fishing hook 42 in a captive slidable position on a skate rack 22, and its respective gangion 44 depends below, in turn holding up a respective portion of the ground line 46, thereby resulting in the coiling of ground line 46 throughout the skate rack 22, as illustrated in FIG. 2. When a skate rack 22 is filled with a skate, the tiltable alignment and spacer positioner 74 is tilted clear and this skate rack is moved along the hanger beams 60. Then another empty skate rack 22 is located in its place and the positioner 74 is tilted back to maintain the alignment and spacing, as it is filled with a skate length of the long fishing line 24. This process is repeated until the entire long fishing line 24 has been hauled in. The side by side filled skate racks 22 are all then supported by the hanger beams, which in turn are held above the main deck 80 by the four stanchions 98 and their respective base plates 100.

Handling of Snarls and Entanglements and Repairs

During this hauling in operation, if snarls and entanglements are observed as the long fishing line 24 is pulled in, crew persons help to guide these snarls and entanglements past the main hauler 32 and stack 34, and still manage to load the skate racks 22 without essentially slowing down or stopping the hauling in operations. Then between settings or deployments of the long fishing line 24, corrections and repairs are undertaken of these snarls and entanglements and other failures, such as losses of hooks 42 and/or gangions 44, or near separations of the ground line 46. The loaded movable skate racks 22 are conveniently separated for inspection and those possible necessary repairs of their hook supported skates 36. To increase the overall efficiency of such long fishing line apparatus 20, another complete set of skate racks may be employed. The additional set may be mounted above or alongside the first set depending on the overall size and design of a fishing boat or ship 72. By having such an additional set, continued setting of a new long fishing line 24 may be immediately undertaken, even though the long fishing line 24 just hauled in was in the need of extensive repairs.

Setting

Upon setting a long fishing line 24, a filled skate rack is held by the tiltable alignment and spacer positioner 74, as a buoyline 62 and its anchor, not shown, and its float, not shown, are first secured to the ground line 46 of the first filled skate rack 22. Then with the ship or boat 72 underway, the buoy, is thrown over and the buoyline 62 follows and soon the anchor is reached and directed overboard taking respective ends of the buoyline and ground line 46 with its gangions 44 and baited hooks 42 down toward the bottom. After the buoy is thrown in, the relative motion between the boat and the long fishing line creates a continuing force to pull the respective skates 36 from successive racks, as the ground lines of such successive skates have been tied together or have remained tied together. Each fishing hook 42 is guided through the water stirred baiter 40 to snag bait, a follow on bait recovery channel 76 and then into the sea.

Baiting the Fishing Hooks

During the setting of the long fishing line 24, the ground line 46 with its fish hooks 42 and their gangions 44 are directed by a guide 104 having three near converging surface structures 106, 108, and 110, which are parts of an overall fish hook baiter 40, supported on a stanchion 112 and base plate 14. The hooks are passed through a bait containing channel or baiting channel 118 to snag pieces of bait, then through a non snagged bait recovery channel or chute 76, serving also as a guide to direct the departing baited skate over the stern 82 of the boat 72 and into the sea.

Figure 3:
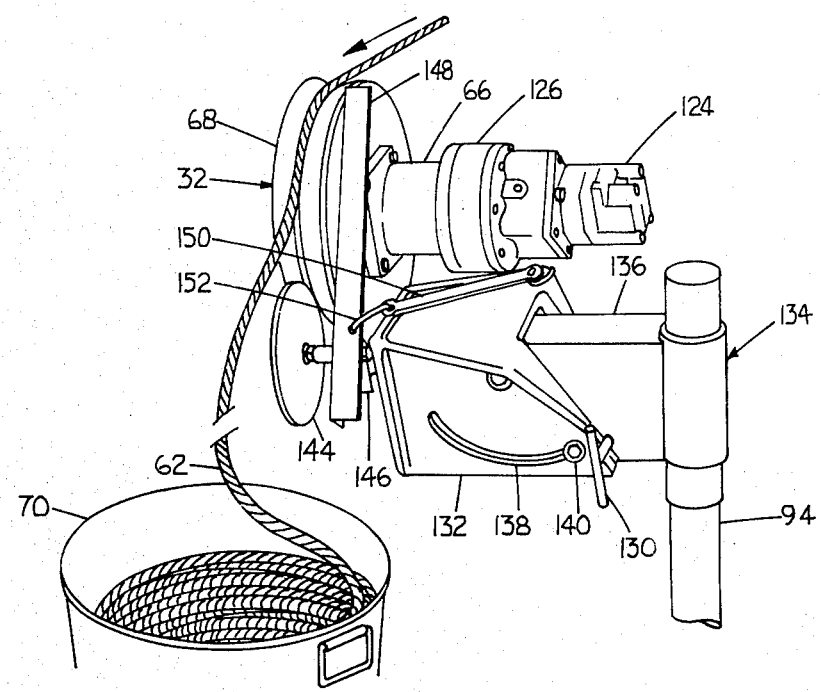
FIG. 3 is a perspective view of the upper portions of a main hauler arranged for hauling in a buoyline for its immediate coiling in a tub, as the sheave of this hauler revolves in a vertical plane about a rotative drive shaft, then in a horizontal position and being driven by a hydraulic motor, with the horizontal to vertical positioning components of this main hauler being shown, and with the direction of movement of the incoming buoyline being indicated by an arrow.

PREFERRED CONSTRUCTION, ASSEMBLY, AND OPERATION OF THE COMPONENTS OF THE SABLE ETC. FISHING LONG FISHING LINE APPARATUS Main Hauler Operated in Both Vertical and Horizontal Positions As illustrated in FIG. 3, the main hauler 32 is arranged for hauling in a buoyline 62 for its coiling in a tub 70, as its sheave 68 rotates in a vertical plane about its rotative drive shaft 66, then in a horizontal position and being driven by a hydraulic motor 124 through a speed reducer unit 126. Whereas in FIG. 4, this main hauler 32 is arranged for hauling in the ground line 46 with its gangions 44 and fish hooks 42, i.e. the long fishing line 24, as its sheave 68 rotates in a horizontal plane about its rotative drive shaft 66, then in a vertical position.

This changeover from the sheaves vertical position to its horizontal position is taken as the restraining pin 130 is pulled clear and the pivoting portion 132, of the main haulers overall support 134, tilts downwardly about the non pivoting or stationary portion 136, while guided by the cam slots 138 and stationary follower 140, of these respective pivoting and non pivoting portions 132, 136. In this latter position, the restraining pin is not needed.

Figure 4:
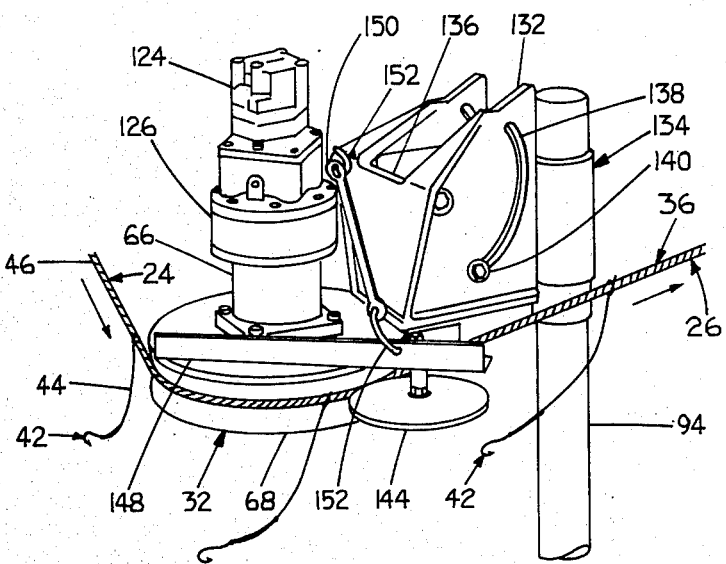
FIG. 4 is a perspective view of the upper portions of the main hauler arranged for hauling in the long fishing line under varying tension in the incoming line, as the sheave of this hauler revolves in a horizontal plane about a rotative drive shaft, then in a vertical position and being driven by the hydraulic motor, with the vertical to horizontal positioning components of this main hauler being shown, with the resiliently biased line following wheel and line stripper being illustrated, and with the direction of the movement of the incoming long fishing line carrying its gangions and hooks being indicated by arrows.

The movement of the pivoting portion 136 is undertaken to always insure the line being pulled in, i.e. first and buoyline 62 and then the ground line 46, will continue to travel essentially along the same transverse direction over the deck as indicated in FIGS. 1, 3 and 4, in keeping with a design objective that the line remains within a two inch longitudinal range, in respect to the length of the fishing boat.

As shown in FIG. 4, a resiliently biased line following wheel 144 is used to help keep the ground line 46 in contact with the sheave 68, until the departure locale is reached. If the ground line 46 should continue too far, it is moved clear by a stripper 146. This line following wheel 144 is rotatably mounted to a pivotally mounted bar 148, secured to the pivoting portion 132 of the overall support 134. It is biased toward the ground line 46 and sheave 68, by a resilient member 150, attached by hooks 152 at each of its ends, respectively, to the pivotally mounted bar 148 and to the pivoting portion 132 of the overall support 134.

Slack Taker

As shown in FIG. 5, the slack taker 34, has its sheave 68 always positioned horizontally and it is driven by a hydraulic motor 128. It also has a like resilienty biased line following wheel 144 and a stripper 146. In serving to effectively deliver the ground line 46 with its gangions 44 and fish hooks 42, so a crew person may rapidly and readily place the fish hooks 42, on the skate racks 22, the operation of the slack taker 34 is also undertaken to protect the crew person from any bad results of over tension stresses being experienced at the main hauler, and also to substantially eliminate any excessive line twisting tensional forces. Moreover, when extensive snarls and entaglements are encountered, the astute operation of the respective main hauler 32 and this slack taker 34 are undertaken, while such entaglements are reduced by crew persons to permit their passing on to the skate racks 22 for furher work after the hauling in is completed.

Movable Skate Racks, Their Hanger Beams and Their Support of the Fish Hooks and a Skate In FIG. 6, an end of a movable skate rack 22 is illustrated to show one of its two ends cutout structures 156, formed to slidably fit about the lower flange 158 of one of the two hanger beams 60, which are preferably I Beams. The skate rack 22 is preferably made from a stainless steel plate formed to have an integral receiver 54 with a near top opening 52, and formed to have an upstanding integral planar bar 56, from which the cutout structures 156 are formed.

As illustrated in FIGS. 6 and 7, the fishing hooks 42 are placed so their barbed ends 50 are restrictively retained in the receiver 54 and their shanks 160 are depending vertically to position their eyes 162 for attachment to the gangions or leaders 44. The barbed ends 50, of the fishing hooks 42, when so restricted, butt up against the downwardly turned end 53 of the integral receiver 54. The near top opening 52 is the space between the side of this turned end 53 and the side of the integral planar bar 56. The interior 55 of the integral receiver 54 is sized large enough to receive the barb ends 50 of various sizes of hooks. The entry or removal of the barbed ends 50 of the fishing hooks 42 from the receiver 54 must be undertaken either by sliding the fish hooks 42 out a longitudinal end of a receiver 54, or preferably by rotating the fishing hooks 42 first and moving their then turned or rotated barbed ends 42 through the top opening 52 of the receiver 54. Also the initial longitudinal start of the top opening 52 may be made wider, so the sliding retention of the barbed ends 42 of the fish hooks 42 in the receiver 54 may be more readily initiated by a member of the crew who takes the fishing hook as it leaves the slack taker and optionally vertically moves the fishing hook downwardly or inserts it endwise to be held by the receiver of the skate rack. In summary, fishing hooks 42 both straight and offset, of many sizes are held, in skate racks 22, as their respective barbed ends 50 are held, until rotated clear of the downwardly turned end 53 and lifted up through the near top openng 52, or until the barbed end might be cleared out through a longitudinal end of the interior 55 of the integral receiver 54. The fast loading and unloading of the skate racks 22, wherein the fishing hooks 42 are loded at one end of the skate rack 22 and unloaded, i.e. pulled off, the other end of the skate rack 22, is the usual way the fishing hooks 42 enter, slide, and depart. However, when one or a few of the fishing hooks 42 are to be inspected or changed, then the fishing hooks 42 are rotated to effect the clearance and lifting of their barb ends 50. Such removal rotation occurs simultaneously in more than one plane to effectively clear the near top opening 52. Also the fishing hooks 42 may be straight, i.e. all portions in one plane, or offset.

The upstanding planar bar 56, beyond the near top opening 52, provides structure for the cutout structures 156, and when the barb ends 50 of the fishing hooks 42 are inserted, this upstanding planar bar 56 also serves as a vertical guide during the insertion of the barbed ends 50.

Figure 8:
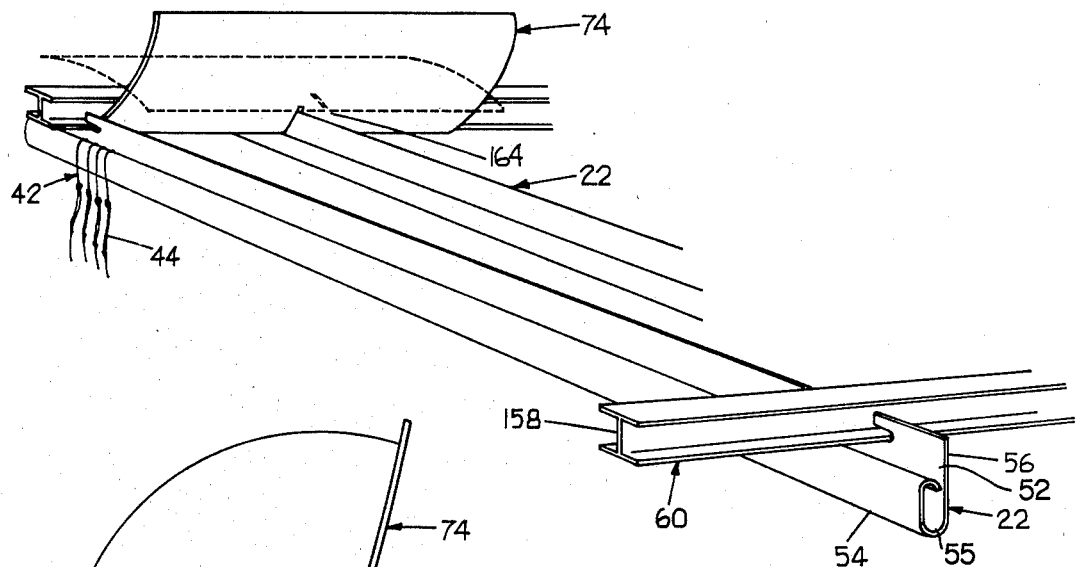
FIG. 8 is a partial perspective view of the spaced hanger beams, which slidably receive the movable skate racks, as their cutout structure of their integral upright full length planar bars are respectively slidably fitted over the respective lower flanges of the hanger beams, which are preferably I beams, and also shown is a tiltable alignment and spacer positioner arranged in an active configuration to align and to hold an otherwise movable skate rack in its active position, to be either discharging the long fishing line into the baiter, or receiving it from the slack taker.
Figure 9:
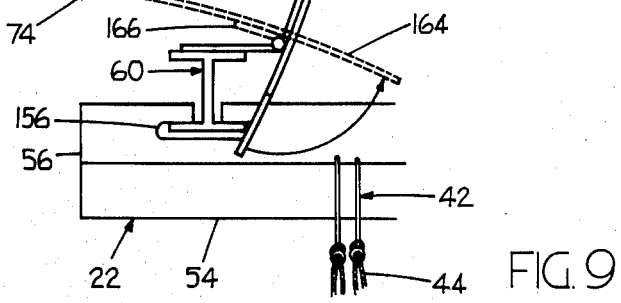
FIG. 9 is a partial cross sectional view to illustrate how the tiltable alignment and spacer positioner, shown in FIG. 8, is moved from its active position to its inactive position, the movement being shown with dotted lines and motion arrows, as it occurs about the hinged mounting of this positioner to the respective hanger beam.
Figure 10:
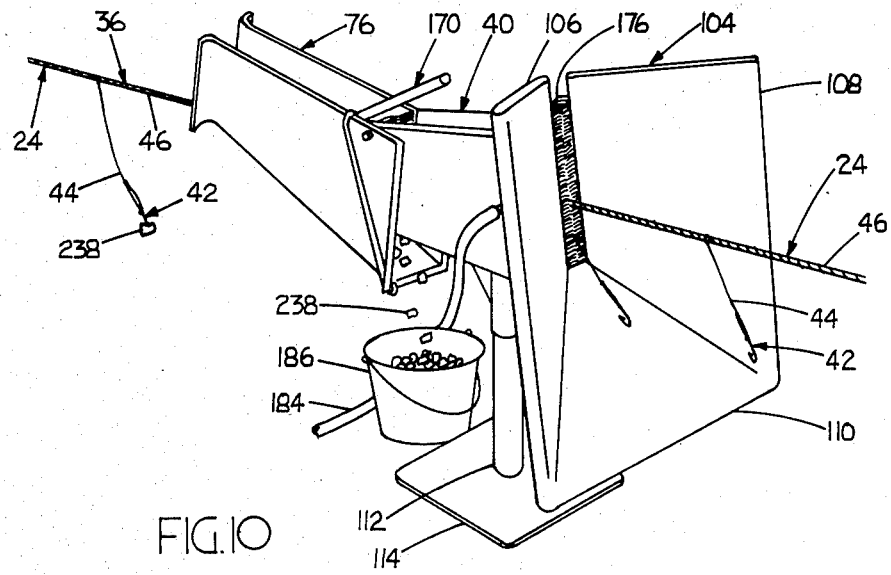
FIG. 10 is a perspective view of the overall baiter illustrating: a guide having three near converging surface structures to direct the long fishing line, i.e. the ground line with its spaced gangions and fish hooks, into the entry of the bait channel structure; opposed synthetic fiber brushes located at the entry of the bait channel to position the gangions and their hooks upon their entry, so the hooks will be well baited; the open top and open ended bait channel to receive cut bait from above and to receive water under pressure from at least one side, thereby agitating the pieces of bait for their more effective snagging by the moving fish hooks; a loose bait retrieving channel, serving also as a discharging guide for the departing baited long fishing line, indicating how the loose bait is collected below in a bucket for its subsequent reentry into the bait channel; the exit nylon bristle brushes, serving as the rear confining structure of the bait channel and also to help set the snagged bait on the passing fish hooks, while keeping the bait, not as yet snagged, in the bait channel for recirculation in the agitated water; and a handle-lever frictional brake used to retard or stop the otherwise discharging long fishing line, if adjustments to gangions, hooks, or the ground become necessary, or if weights or floats are to be snapped on to the ground line.
Figure 11:
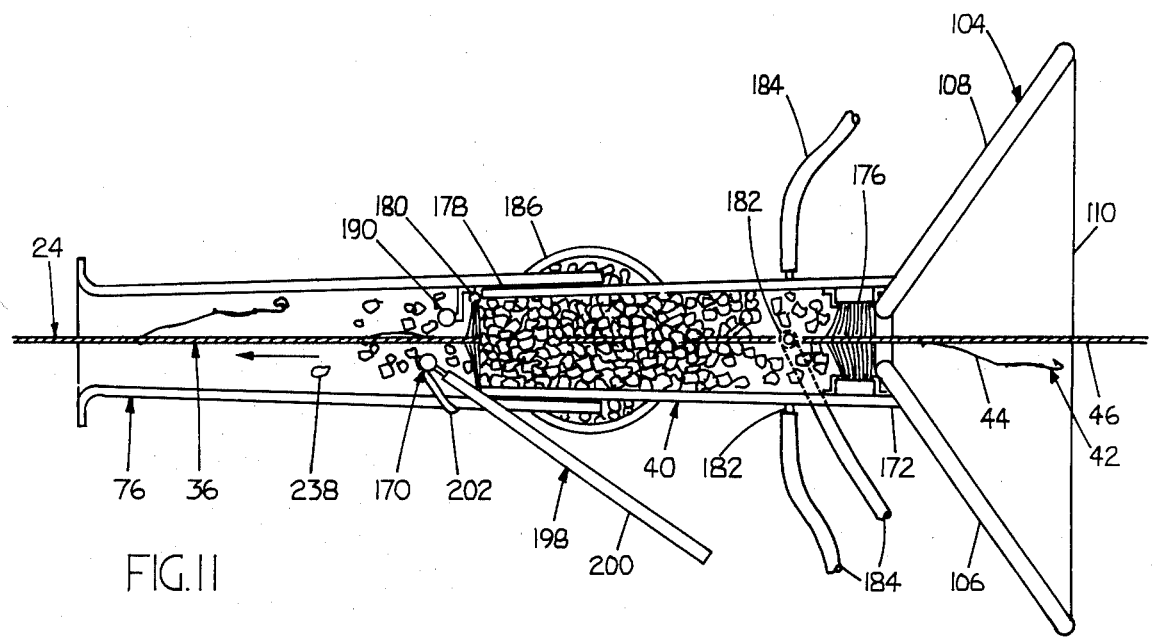
FIG. 11 is an enlarged top view of the overall baiter, shown in FIG. 10, illustrating how the long fishing line is guided into the synthetic fiber brush entry of the bait channel, thereby positioning the gangions so their carried fish hooks snag the bait, being constantly stirred up by the action of water entering under pressure from one, two, or three, openings in the bait channel; showing the nylon bristle brush exit of the bait channel, with the bristles helping to complete the snagging of the bait, while blocking the escape of bait not hooked, for its recirculation in the agitated and stirred water; depicting the recovery of some escaping bait, not hooked or snagged, in the discharging guide for its recovery below in a bucket; and illustrating the handle-lever frictional brake applied to retard or stop the otherwise discharging long fishing line, and at other fishing operational times held in an open non braking position by the force of a tension spring.
Figure 12:
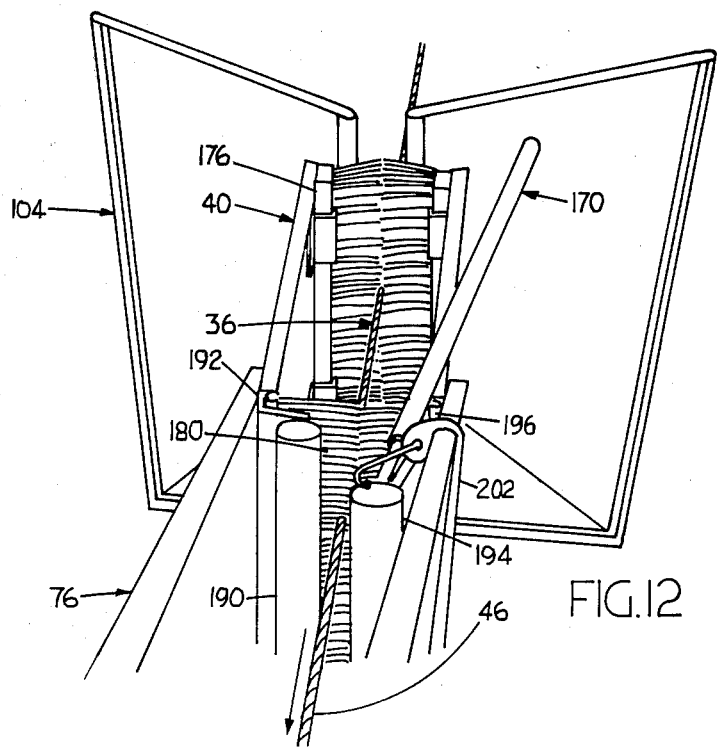
FIG. 12 is an enlarged partial perspective view illustrating how the long fishing line is guided through the bait channel, essentially midway from each side, being responsive to the reaction of the resistive bristles of the synthetic fiber brushes and the nylon bristle brushes, respectively located at the entry and exit of the bait channel, and showing the inactive position of the handle-lever frictional brake used to retard or stop the otherwise discharging long fishing line.

Tiltable Alignment and Spacer Positioner Used With a Skate Rack, Either Being Loaded With a Skate, or Having a Skate Removed From It In FIGS. 8 and 9, one skate rack 22 is illustrated located at the active position along the hanger beams 60, when it is either being loaded with a skate 36 or having a skate 36 removed from it. To maintain this skate rack 22 in this position, aligned both with the direction of incoming ground line 46 leaving the slack taker 34 and the entry of the fish hook baiter 40, a tiltable alignment and spacer positioner 74 is used. It has a centered lower slot 164 to fit over the top of the integral planar bar 56 on the skate rack 22, and spaced hinges 166 to pivotally mount it on a hanger beam 60. A crew person by pushing on its top in respective directions either rotates the tiltable alignment and spacer positioner 74 into or out of restrictive positioning engagement with a skate rack 22, as shown by FIG. 9 by the motion arrows and dotted lines.

Fish Hook Baiter

In FIGS. 1, 2, 10, 11, and 12, the fish hook baiter 40 is shown serving also as a mounting and operational place for a ground line brake 170, which consequently is also illustrated. The ground line 46 with its gangions 44 and fish hooks 42 being drawn off the skate rack 22 is directed by a guide 104 having near converging surface structures 106, 108, and 110 to the entry 172 of the fish hook baiting channel 118. Paired nylon and/or synthetic fiber brushes 176 are oppositely positioned at this entry 172 with bristle ends in movable contact. They serve two purposes: one to confine bait in the baiting channel 118; and the other to align the gangions 44 and consequently the fish hooks 42, so they in turn are better positioned to successfully snag portions of the bait as they are drawn through the baiting channel 118. At the exit 178 are paired nylon bristle brushes 180 oppositely positioned to serve two purposes: one, to assist the completion of snagging portions of the bait; and the other, to confine the non snagged bait to the baiting channel 118.

During this baiting of the fish hooks 42, water, under pressure, is directed through openings 182 in the baiting channel 118 by using hoses 184 preferably at its lower entry. One or more of such water streams are useful in agitating and stirring the bait, thereby making the overall baiting more effective as the bait snagging is increased.

Beyond the baiting channel 118 is a tail chute, or a bait recovery chute or channel 76, serving two purposes: one, to collect any unhooked bait which may clear the baiting channel 118 or drop off of the hooks, and direct this free bait to a collection bucket 186 located below it, for the return of this bait to the baiting channel 118; the other, to guide the ground line 46 and its gangions 44 and fish hooks 42 over the stern 82 of the boat or ship 72 for lowering into the sea. Preferably, the exit end of this bait recovery channel 76 will be mounted to the stern 82 of the boat 72 by a support, not shown, but somewhat especially made with respct to each overall installation.

Ground Line or Long Fishing Line Brake

Also shown in FIGS. 1, 2, 10, 11 and 12 is a ground line or long fishing line brake 170, or pinch brake, used on occasions to temporarily stop the setting of the long fishing line for such purposes as: adding floats or weights, neither is shown, inspect, untangle, modify, or quickly repair the string of gear 26, or refill the baiting channel 118. The braking occurs as two vertical cylinders are moved relatively toward one another. One of these cylinders 190 is immovably mounted on a stationary bracket 192, secured in turn to the end of the bait containing channel 118 at one side thereof. The other cylinder 194 is hinged 196 to the end of the bait containing channel 118 at the other side thereof. A brake handle 198, with a removable end 200, is secured to the movable braking cylinder 194 to pivot it on its hinge 196 into near contact with the stationary braking cylinder 190, thereby compressing the ground line 46 to retard its motion, and, as necessary, to stop its motion. Upon release of the brake handle 198, the movable pinch brake cylinder 194 is rotated clear of the ground line 46 and away from the immovable pinch braking cylinder 190 to its rest position alongside the rear edge of the baiting channel 118 and at the entry of the bait recovery channel or chute 76, by the force of the tension spring 202, connected between the top of the movable braking cylinder 194 and the side of the bait recovery chute or channel 76.

Bait Chopper

Figure 13:
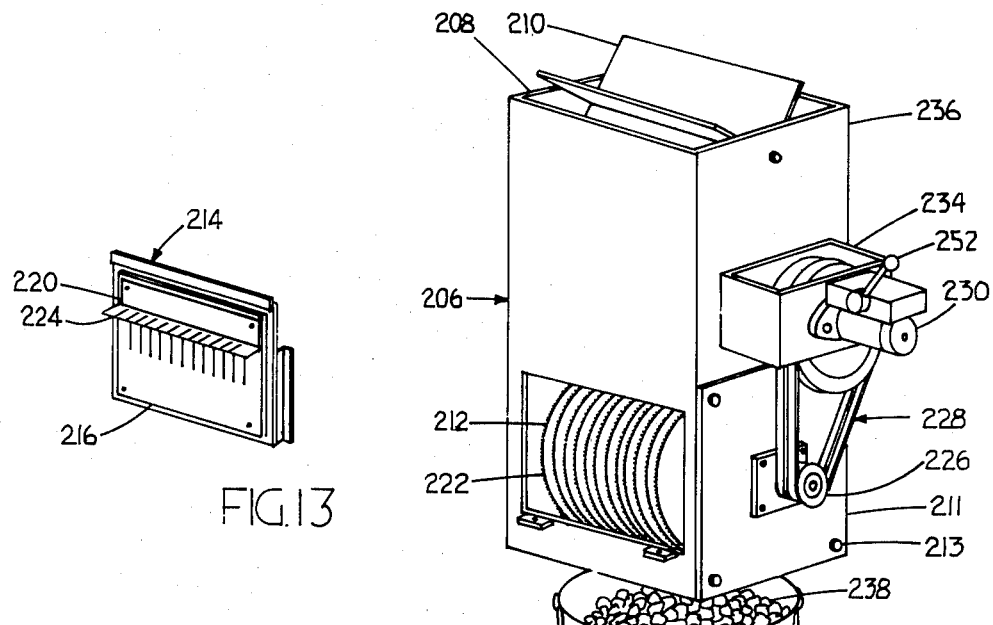
FIG. 13 is a perspective view of the bait chopper, with a lower front cover removed to illustrate the spaced positioning of regular circular saw blades and the slotted flange and grooved nylon block, both secured to the inside of this lower front cover, to insure the complete cutting of the bait, before its discharge below, in sectional pieces, into a bucket used to load the bait channel of the baiter, indicating the rotatably paddle wheel-like shield at the top entry offering personnel protection from the revolving blades, and also protection to the blades from debris not wanted beyond this entry; and illustrating the hydraulic motor, controls, and belt transmission drive of the revolving shaft supporting the changeable spaced regular circular saw blades.
Figure 14:
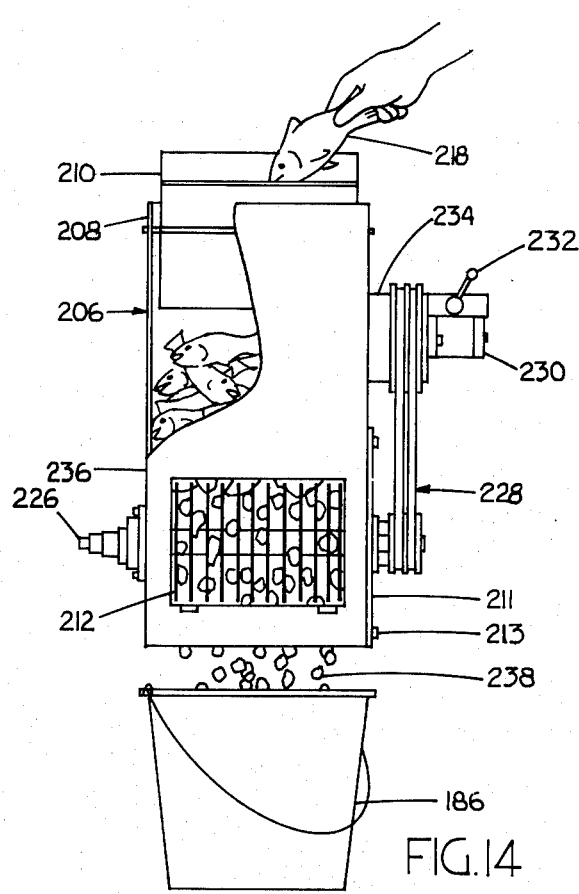
FIG. 14, is a side view, with portions broken away and the lower front cover removed, to illustrate how the bait chopper, shown in FIG. 13, receives the bait fish from the paddle wheel-like shield at its top entry, cuts the bait fish upon the high speed operation of regular circular saw blades, and discharges the cut bait into a bucket placed below it on the deck of the boat.

As illustrated in FIGS. 1, 13 and 14, a bait chopper 206 is provided to conveniently and rapidly cut bait to selectable sizes. Its top entry 208 has a rotatable mounted paddle wheel-like shield 210 offering protection to crew persons from the revolving regular circular saw blades 212 installed below, and also protection to these blades 212 from debris not wanted beyond this top entry 208. The number of these regular saw blades 212 and consequently their spacing is selectable, thereby, through adjusting their number and spacing, the sizes of the bait are selectable. The removal of the blades 212 is through an opening covered by plate 211, in turn secured by fasteners 213. Prearranged various spaced sets of blades may be interchanged.

As shown in FIG. 13, the inside of the inspection and blade access cover 214 is equipped with a wood or nylon block 216, cut away only by tooth portions of these rotating circular saw blades 212 during bait chopping operations, thereby limiting clearances to insure better cutting of the bait fish 218. For a like purpose a slotted metal flange 220 is also mounted on the interior side of this cover 214, and peripheral blade portions 222 rotate through the slots 224 of this metal flange 220 with limited clearances. The chopped, i.e. sawed, bait 238, drops below into a bucket 186 on the deck 80 for its carrying and dumping into the baiting channel 118 of the fish hook baiter 40.

The revolving blades 212 and their arbor shaft or mandrel 226, via a belt transmission drive 228, are powered by a hydraulic motor 230, controlled upon movement of the lever 232. These components are positioned by frame 234, in turn secured to the housing 236 of the bait chopper 206. The source of the hydraulic power to operate the motor 230 is preferably the main hydraulic system 242 of the boat or ship 72.

Hydraulic Power System

Figure 15:
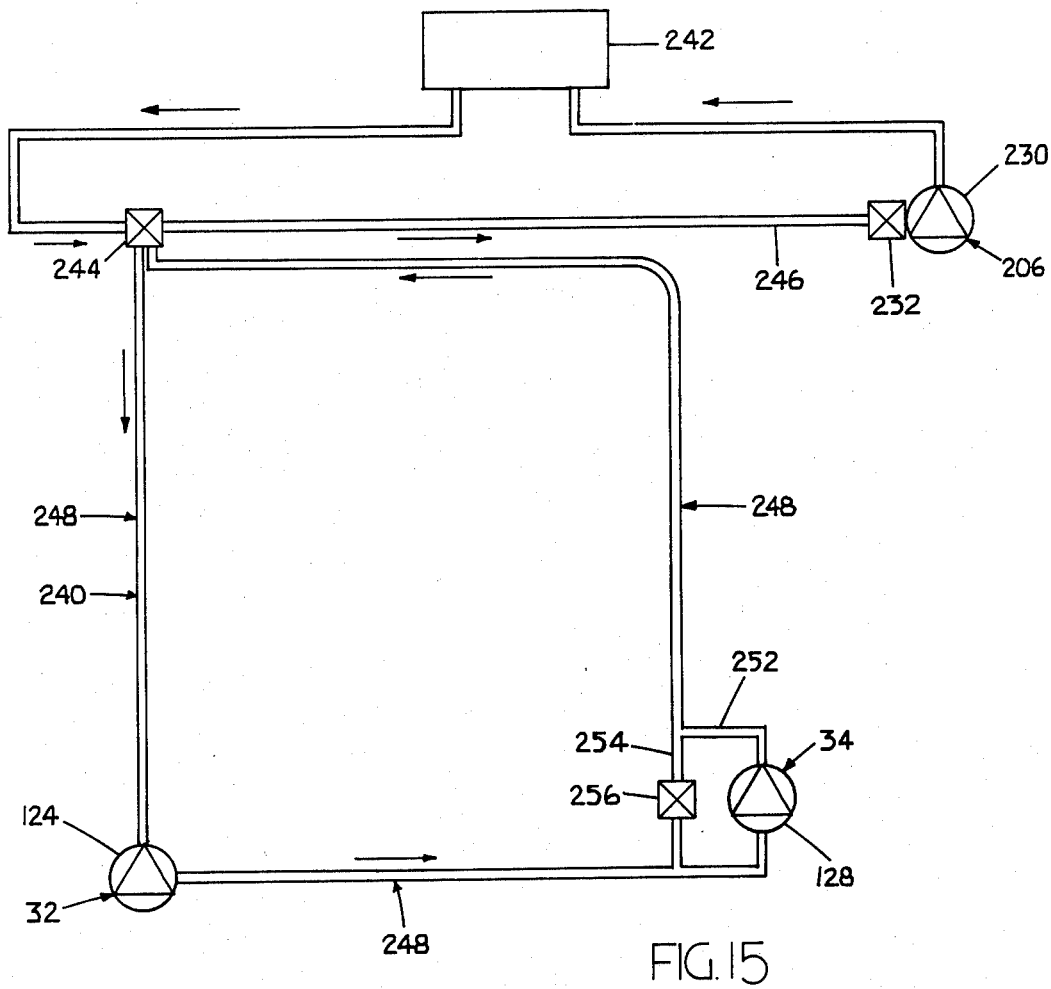
FIG. 15 is a schematic diagram of the preferred hydraulic system operating this long fishing line apparatus, utilizing pressurized hydraulic oil from a main hydraulic system of a fishing boat and via control valves, distributing hydraulic control oil; to operate the bait chopper motor via one hydraulic branch of this auxiliary system, and to operate, in series, the main hauler motor and the slack taker motor in another branch, with the latter motor hydraulic line having a parallel hydraulic line equipped with a ball or needle regulator valve, which is adjusted to further regulate only the speed of the motor of the slack taker, and consequently the effects of slack takers operations on the tension created in the long fishing line.

Many variations of hydraulic power systems may be used; however, in FIG. 15, a preferred power system 240 is schematically illustrated, being dependent on a boat or ship 72 having its own main hydraulic system 242 installed initially for other purposes, and having the capacity to operate the various hydraulic motors of this Sable etc. fishing long line fishing apparatus 20. A selectable arrangement of control valves such as the principal control valve 244, and control valve of the bait chopper 206 through their operations; direct hydraulic oil under pressure in a circuit 246 serving only the bait chopper hydraulic motor 230, and in another circuit 248 serving both the hydraulic motor 124 of the main hauler 32 and the hydraulic motor 128 of the slack taker 34. Preferably in this hydraulic circuit serving both the main hauler 32 and slack taker 34, there are parallel hydraulic circuit branches 252, 254 at the locale of the slack taker 34. In one branch 252, the slack taker motor 128 is installed, and in the other branch 254, a flow regulator valve 256 is installed. When valve 256 is closed, the main hauler motor 124 and the slack taker motor 128 operate at the same speed. However, as the flow regulator valve 256 is opened, the speed of the slack taker motor 128 reduces. This differential speed capability is utilized by crew persons when handling the incoming long fishing line 24 to assist them in their loading of the skate racks 22 and in their handling of snarls and entanglements.

Performance and Specifications

With respect to the illustrated embodiment of the long fishing line apparatus 20, installed on a fishing boat 72, during setting operations, preferably with a crew of four, the buoy is thrown overboard and the buoyline follows with the boat 72 underway at full speed and then the boat 72 is slowed down and the anchor is directed into the sea, taking the respective ends of the buoyline 62 and ground line 46 toward the bottom of the sea. Thereafter a string of gear 26 with its various skates 36 is set at 3 to 5 knots without stopping or slowing the boat between the setting of skates 36, through the convenient handling of the movable skate racks 22. The average time is 35 minutes to set 1200 fathoms of buoyline and 7 skates of 2100 fathoms with their 4200 fishing hooks. During this fast setting the baiting efficiency is approximately 85 to 95 percent.

Upon hauling in the Sable etc. fishing long fishing line 24, the main hauler sheave 68 rotating in a vertical plane brings in the buoyline 62 so it essentially is automatically self-coiled either on the deck 80 or into a suitable container such as tub 70. Then this main hauler sheave 68 is positioned for rotation in a horizontal plane to bring in the ground line 46, its gangions 44, and fishing hooks, 42. As the ground line is pulled over the boats side roller assembly 86, the fish caught are removed from the hook 42 without stopping the ground line 46. when snarls and tangles have occurred, as necessary, they may be led around the main hauler and slack taker and on to the skate or hook rack area, so the hauling may continue without interruption. The average time for this hauling operation bringing back in the 1200 fathoms of buoyline and the 7 skates with their collective 4200 hooks is 2 hours and 20 minutes, or 20 minutes per skate of 600 hooks. It is comfortably possible for four crew persons to set and to haul in, i.e. run, 8000 to 12000 hooks per fishing day. In so doing the fish chopper is operated, chopping, i.e. sawing, 50 pounds of bait in three minutes, i.e. 600 pounds of bait in 25 to 30 minutes. Also gurry bait may be chopped.

The ease of overhaul of the sable etc. fishing long fishing line 24 is outstanding. The components of the string of gear 26, or the skate 36, i.e. the ground line 46, the gangions 44, and the fishing hooks 42, when hanging on a skate rack 22 are easily accessible to the crew member. Each hook may be straightened or replaced; gangions may be replaced; and groundline spliced without removing the other portions of the skate from the movable skate rack. As necessary, a loaded selected movable skate rack may easily be cleared by untieing the ground line knots at the skate ends and carrying it to a storage area or a more convenient repair work space. Snarls may be easily untangled and/or replaced while a skate is on a movable skate rack. This possible ease of the long fishing line overhaul means that each skate, and consequently the entire line is essentially in top condition for fishing at a potential efficiency of 100 percent at all fishing times.

When fishing for halibut, the main hauler with its sheave rotating in a vertical plane is operated to haul in and self coil tub type halibut fishing gear. Also the main hauler, with the addition of a roller type idler, not shown, and operated with its sheave rotating in a horizontal plane, may be used as a gurdy for handling conventional manually coiled halibut fishing gear.

The skate racks depending on the available deck space are provided in lengths up to 12 feet with the general range being between 7 and 10 feet. An objective is to hang one 1800 foot skate on each movable skate rack. The gangions with their respective hooks are fastened to the ground line at intervals or spaces in the range of 30 to 48 inches. The gangions are 10 to 25 inches long, with the preferred range being 14 to 17 inches long. The skate racks are preferably made from 11 to 14 gage stainless steel plate. Their cutouts or slots are ⅜ by 2 inches with a centered opening to accommodate the sliding and hanging of the movable skate racks on 1½ inch I beams.

The main hauler preferably is driven by a hydraulic motor having a 200 to 300 rpm operating range driving the sheave through a 5 to 1 speed reducer. The mounting galvanized structure of this main hauler preferably is made of 4 inch heavy walled steel pipe and ½ by 24 by 28 steel plate. The motor mounting material is ½ inch steel plate. Conventional halibut gurdy sheaves are used with nylon or bronze following wheels, and stainless steel strippers. The slack taker incorporates a 200 to 300 rpm hydraulic motor, a like halibut gurdy sheave, and a like nylon or bronze following wheel with like stripper. Galvanized steel pipe and a ½ inch base galvanized steel plate 18 by 24 inches serves as its base.

The baiter is fabricated from 1/16 inch to ⅛ inch stainless steel plate and it is supported on a four inch heavy walled galvanized steel pipe and a ½ inch galvanized steel deck plate. The entry brushes are 2" by 18" with stiff bristles of synthetic fiber, i.e. a floor type brush. The exit brushes are ⅜" by 14" plastic or nylon bristle brushes, i.e. the industrial sweeper type. Also the tail chute or bait recovery chute or channel is preferably supported, not shown, to the stern of a boat.

The bait chopper is fabricated from 3/16 and ¼ galvanized steel plate. A 900 to 1500 rpm hydraulic motor is used with a 2 to 1 speed reduction belt drive. A 1 to 1½ inch diameter arbor shaft receives several 10" diameter regular saw blades spaced apart by collars at 9/16 to 3" intervals. The size of the chopped bait is determined by the saw spacing.

Other materials and sizes, other mechanical and hydraulic equipment, and other arrangements of the overall fishing ge,ar, may be selected and used by fishermen practicing this method of long line fishing, as learned from the operations of this illustrated and described long fishing line apparatus, centering on the movable and slidable skate racks and their supports, which are so effectively used in handling the skates tied together to comprise the overall long fishing line.

I claim:

1. A long fishing line apparatus, comprising:

(a) movable, multiple, racks, slidably and removably received on supports, capable of being arranged parallel to one another, and adaptable to support a skate, by having a longitudinal receiver, an upstanding planar bar integrally formed with the longitudinal receiver, serving to create one side of a near top opening of the longitudinal receiver, serving also as a vertical guide during placement of fishing hooks along a rack, and formed with end cutout structues to slide over a support, with fishing hooks of various sizes, both planar and offset, being rotated, then their also rotated barb ends are lowered through the top opening and into the interior of the longitudinal receiver, and then afterwards, upon counter rotation of the barb ends, and also consequently counter rotation of the fishing hooks, these fishing hooks are retained on their respective movable, multiple rack, via this restrictive gripping of their barbs, while also being slidable in one end and out the other end of the rack; and (b) a support having two parallel beams to removably and to slidably interfit with the end cutout structures of all of the upstanding planar bars integrally formed with the longitudinal receivers to create the various movable, multiple, racks, which are so supported whether empty or loaded with a skate.

2. An integral skate rack of long fishing line apparatus, comprising a hollow longitudinal receiver portion and an upstanding planar bar portion, which in one locale are spaced apart to form a near top respective entry into the hollow interior of the receiver portion, the near top respective entry adapted to receive the barb ends of fish hooks after their rotation, and then upon the counter rotation of the fish hooks, these barb ends are not able to pass back through the respective entry and they are held in a vertical plane in the hollow interior of the receiver portion until their intentional rotation, allowing, however, the fish hooks to slidably move in a horizontal plane along the receiver portion, and upon reaching an open end at either end of the rack to be longitudinally withdrawn from the receiver portion, and the upstanding planar bar portion has end cutout structures adapted to slidably and restrictively receive supports.

3. An integral skate rack as claimed in claim 2 having a support of a long fishing line apparatus to receive it and other multiple movable skate racks, each support comprising parallel members to removably receive at their ends the skates in parallel positions, as these parallel members support the respective ends of the skate racks via their cutout structures on their upstanding planar bar portions.

4. An integral skate rack, as claimed in claim 3, wherein on one parallel member an alignment and positioner is secured by a hinge and pivoted into and out of straddling engagement with one of the otherwise multiple movable skate racks, in a non interference position with the sliding removal of the fishing hooks and all of the respective skate.

5. An integral skate rack as claimed in claim 4, wherein the parallel members are each mounted on deck supports which are positioned to clear the movements of all the multiple movable skate racks along the parallel members.

6. A fish hook baiter of long fishing line apparatus, comprising:

(a) an open top and open end channel to receive chopped bait;

(b) a set of rectangular bristle brushes oppositely positioned one another with their bristles contacting at one open end of the channel to position oncoming fish hooks for their subsequent snagging of bait and to confine the chopped bait from passing through this open end;

(c) a set of rectangular bristle brushes oppositely positioned one another with their bristles contacting at the other open end of the channel, and to allow the baited hooks to pass on through the bristles of the brushes; and (d) a water system injecting water under pressure into the open top and open end channel, from hose connection orifices which are located at least below the bait and alongside the bait, to continuously agitate and to continuously stir the chopped bait to keep the unhooked bait positioned and repositioned for hooking and snagging by the fishing hooks passing through the fish hook baiter.

7. A fish hook baiter, as claimed in claim 6, having a converging shield at one open end of the channel to direct a ground line with its gangions and hooks through the bristles of the brushes and on into the open top and otherwise open end channel for snagging chopped bait on barbs of the fishing hooks.

8. A fish hook baiter, as claimed in claim 6, having a bait recovery and ground line guiding channel at the other open end of the open top and otherwise open end channel to collect any chopped bait, which is drawn through the bristles of the brushes, but which is not snagged or not sufficiently snagged to continue on, while held on a departing fishing hook, being guided with its gangion on the departing ground line over the stern of a boat and into the sea.

9. A fish hook baiter, as claimed in claim 6, wherein the water system has at least one entry in the open top and open end channel for the attachment of a water hose.

10. A fish hook baiter, as claimed in claim 7, having a bait recovery and ground line guiding channel at the other open end of the open top and otherwise open end channel to collect any chopped bait, which is drawn through the bristles of the brushes, but which is not snagged or not sufficiently snagged to continue on, while held on a departing fishing hook, being guided with its gangion on the departing ground line over the stern of a boat and into the sea.

11. A fish hook baiter, as claimed in claim 10, having a mounting for its placement on a deck of a fishing boat in line with a skate rack, in turn positioned for the discharge of its skate.

12. A long fishing line apparatus, for installation on a rear deck of a fishing boat equipped with a hauling in roller at the rail of the ship, comprising:

(a) a main hauler to haul in a long fishing line commencing with the buoyline and continuing with the groundline having the gangions and hooks, having a sheave positionable to rotate in a vertical plane while hauling in the buoyline, and in a horizontal plane while hauling in the ground line with the gangions and hooks, as the line, i.e. first the buoyline and then the ground line, is always being pulled in while traveling along substantially the same transverse direction over the deck and arriving at substantially the same longitudinal position over the deck;

(b) movable miltiple racks slidably and removably received on supports, each of these racks being capable of being arranged parallel to one another, and adapted to support a skate of the long fishing line coming from the main hauler, as the barbs of the fishing hooks are held vertically in place until the fishing hooks are rotated and the fishing hooks remain slidable throughout the racks;

(c) a support to slidably receive the movable multiple racks parallel to one to another, whether empty or loaded with a skate, and to hold sufficient loaded skate racks to receive all of the ground line, gangions and hooks, of a long fishing line coming from the main hauler; and (d) a fishing hook baiter used in baiting the fish hooks of a long fishing line, as this line is pulled from the skate racks, through the fishing hook baiter and over the stern of a boat, having an open top and open end channel to receive chopped bait, a set of rectangular bristle brushes oppositely positioned one another with their bristles contacting at one open end of the channel, both to confine the chopped bait and to position the fish hooks for their subsequent snagging of bait, and a set of rectangular bristle brushes oppositely positioned one another with their bristles contacting at the other open end of the channel, to confine the chopped bait until this bait is snagged on barbs of fishing hooks passing through the open top and the otherwise open end channel, and to allow the baited hooks to pass on through the bristles of the brushes, and a water system injecting water under pressue into the open top and open end channel, from hose connection orifices which are located at least below the bait and alongside the bait, to continuously agitate and to continuously stir the chopped bait to keep the unhooked bait positioned and repositioned for hooking and snagging by the fishing hooks passing through the fish hook baiter.

13. A long fishing line apparatus as claimed in claim 12, comprising, in addition, a slack taker with a driven sheave rotatable in a horizontal plane to haul in the ground line with gangion and fishing hooks being discharged from the main hauler, and to in turn discharge the ground line with gangions and fishing hooks, as the long fishing line is mounted on the skate racks by utilizing the fishing hooks, which are positioned by hand by a member of the crew on the skate racks by endwise sliding them in or dropping the barbed ends in at a wider entry of the skate racks so their barbs are thereafter held in place along the skate racks until the fishing hooks are rotated, and lifted so the barbed ends are cleared from the skate racks, with the fishing hooks remaining slidable throughout the length of the skate racks.

14. A long fishing line apparatus, as claimed in claim 13, wherein each movable multiple rack as a receiver adapted to captively receive barbed ends of fish hooks on gangions secured along the ground line of a skate.

15. A long fishing line apparatus, as claimed in claim 13, wherein each of the movable multiple racks have an integral receiver and integral upstanding bar with a space between them at one longitudinal locale to receive barbed ends of the fish hooks and thereby support their skate, the fish hooks being slidably entered at the end of a skate rack, and thereafter along the skate rack being rotated to insert the barb ends and being counter rotated to withdraw the barb ends from the receiver through the space between the integral receiver and the integral upstanding bar.

16. A long fishing line apparatus as claimed in claim 12, wherein the fishing hook baiter has a guide at its entry to direct the ground line, gangions, and hooks into the channel containing the chopped bait.

17. A long fishing line apparatus, as claimed in claim 12, wherein the fishing hook baiter has a bait recovery and ground line guiding channel at the exit of the channel containing the chopped bait, to collect any chopped bait, which is drawn through the bristles of the brushes, but which is not snagged or not sufficiently snagged to continue on, while held on a departing fishing hook, being guided with its gangion on the departing ground line over the stern of a boat and into the sea.

18. A long fishing line apparatus, as claimed in claim 12, comprising, in addition, a tiltable alignment and spacer positioner, to temporarily position one of the movable multiple racks in alignment with the ground line being hauled in and subsequently in alignment with the ground line being discharged over the stern of a boat.

19. A long fishing line apparatus, as claimed in claim 17, wherein the fishing hook baiter has a guide at its entry to direct the ground line, gangions, and hooks into the channel containing the chopped bait.

20. A long fishing line apparatus, as claimed in claim 15, wherein the fishing hook baiter has a guide at its entry to direct the ground line, gangions and hooks into the channel containing the chopped bait, a bait recovery and ground line guiding channel at the exit of the channel containing the chopped bait, to collect any chopped bait, which is drawn through the bristles of the brushes, but which is not snagged or not sufficiently snagged to continue on, while held on a departing fishing hook, being guided with its gangions on the departing ground line over the stern of a boat and into the sea.

21. A long fishing line apparatus for installation on the rear deck of a fishing boat equipped with a hauling in roller at the rail of the ship, for longlining fishing operations, comprising:

(a) a main hauler to haul in a long fishing line commencing with the buoyline and continuing with the ground line having gangions and fishing hooks, having a sheave positionable to rotate in a vertical plane while hauling in the buoyline transversely over the deck as this buoyline line leaves the hauling in roller, and also positionable in a horizontal plane while hauling in the following on ground line with the gangions and fishing hooks, this line hauling continuing along on substantially the same transverse direction over the deck and arriving at substantially the same longitudinal position over the deck;

(b) a slack taker with a driven sheave rotatable in a horizontal plane to haul in the ground line with gangions and fishing hooks being discharged rearwardly over the deck from the main hauler operating with its sheave in a horizontal position, and to in turn discharge the ground line with gangions and fishing hooks, as the long fishing line is mounted on skate racks by utilizing the fishing hooks which are positioned by hand by a member of the crew on the skate racks by endwise sliding them in or dropping the barbed ends in at a wider entry of the skate racks, so their barbs are thereafter held in place along the skate racks until the fishing hooks, for inspection and repair, are rotated and lifted so the barbed ends are cleared from the skate racks, with the fishing hooks remaining slidable throughout the length of the skate racks;

(c) movable multiple skate racks slidably and removably received on supports, each of these skate racks being adapted to support a skate of this long fishing line coming from the slack taker, as the barbs of the fishing hooks of various sizes, both planar and offset are held in place on these skate racks, each of which have a reciever to receive the barbs of the fish hooks via sliding in at the entry end, or farther on as each fish hook is rotated and lowered and upon counter rotation the barbs are held in place in the receiver along the skate rack, until opposite rotation and lifting occurs, or until the fish hooks are longitudinally and slidably moved out the ends of the skate racks clearing the receiver;

(d) a support to slidably receive the movable multiple skate racks, arranged parallel to one another, whether empty or loaded with a skate, and to hold sufficient loaded skate racks to receive all of the ground line, gangions and fishing hooks, of a long fishing line coming from a slack taker.

(e) a tiltable alignment and spacer positioner to temporarily position one of the movable multiple racks in alignment with the ground line being discharged from the slack taker and the ground line to be discharged over the stern of a fishing boat without interfering with the endwise loading and unloading of a skate on the aligned skate rack; and (f) a fishing hook baiter used in baiting the fish hooks of a long fishing line, as this line is pulled from the skate racks, having a guide at its entry end to direct the incoming ground line, gangions and fishing hooks, then having an open top and open end channel to receive chopped bait, a set of rectangular bristle brushes oppositely positioned one another at the other open end of this channel, with the opposite bristles substantially contacting one another, which positions the fish hooks for snagging the bait, and a set of rectangular bristle brushes oppositely positioned one another at the other open end of the channel, with the opposite bristles substantially contacting one another, whereby the respective sets of bristle brushes substantially successfully confine the chopped bait until this bait is snagged on barbs of fishing hooks passing through the open top and otherwise open end channel and allow a baited hook to pass through, and a bait recovery and ground line guiding channel at the exit of the channel containing the chopped bait, to collect any chopped bait, which is drawn through the bristles of the brushes, but which is not snagged or not sufficiently snagged to continue on while held on the barb of a departing fishing hook being guided with its gangion on the departing ground line over the stern of a boat and into the sea, and a circulating water system receiving water under pressure from below and often from the sides to continuously agitate and to continuously stir the chopped bait in the fishing hook baiter, which as necessary is being hand supplied via buckets to the open top channel.

A long line apparatus, as claimed in claim 21, having, in addition, preferably mounted on the fishing hook baiter, a ground line pinch brake, used on occasions to temporarily stop the setting of the long fishing line for such purposes as: adding floats or weights, inspect, untangle, modify, or quickly repair portions of the long fishing line.

* * * * *